April 12, 1938. C. S. BROWN 2,113,675
METHOD OF FORMING ELECTRICAL CONDUIT OUTLET BOXES
Filed April 22, 1936   4 Sheets-Sheet 1

INVENTOR.
Charles S. Brown
BY Bodell & Thompson
ATTORNEYS.

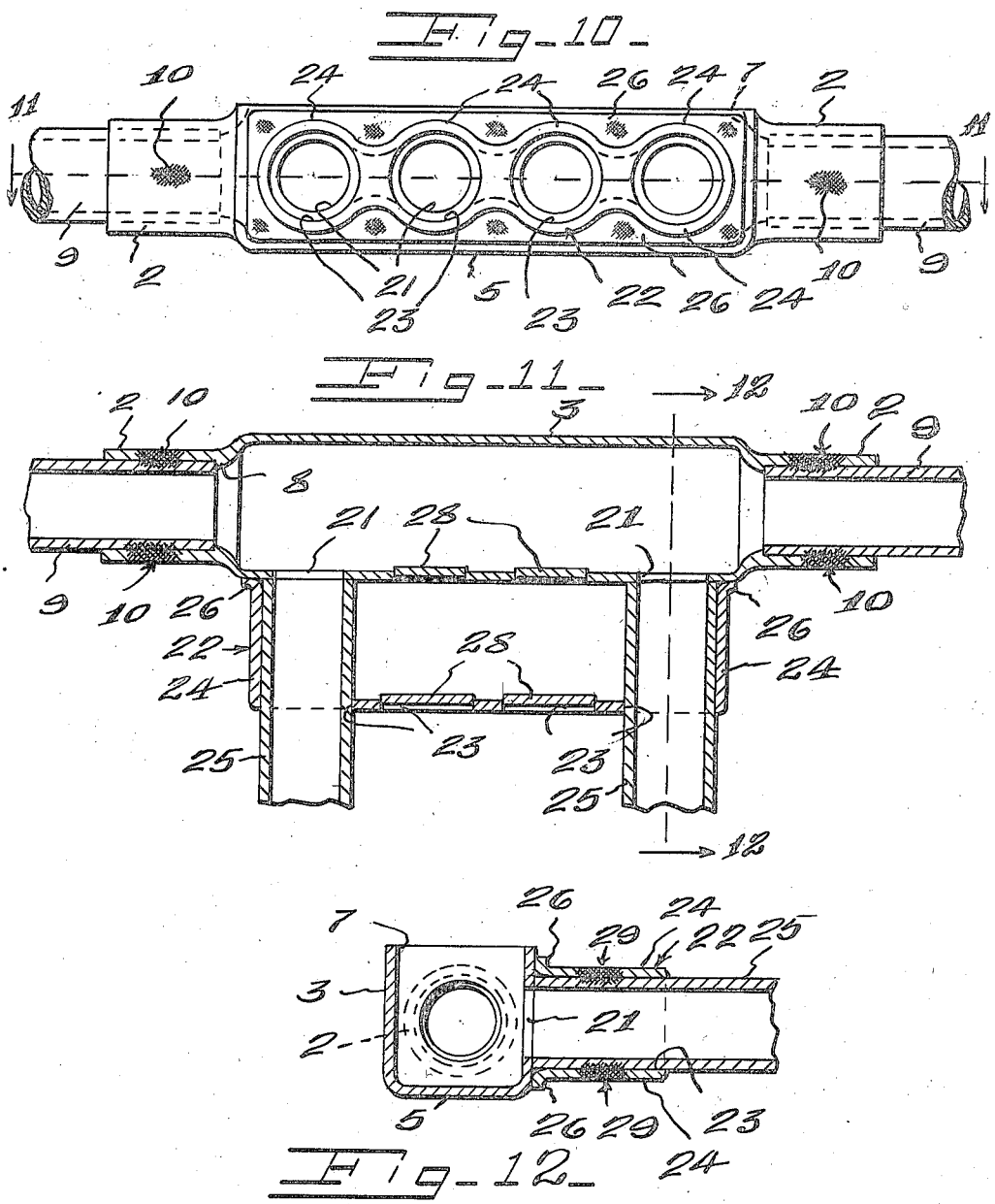

April 12, 1938.                C. S. BROWN                    2,113,675
              METHOD OF FORMING ELECTRICAL CONDUIT OUTLET BOXES
                    Filed April 22, 1936        4 Sheets-Sheet 4

INVENTOR.
                                      Charles S. Brown
                                  BY  Bodill & Thompson
                                              ATTORNEYS.

Patented Apr. 12, 1938

2,113,675

UNITED STATES PATENT OFFICE 2,113,675

METHOD OF FORMING ELECTRICAL CONDUIT OUTLET BOXES

Charles S. Brown, Syracuse, N. Y.

Application April 22, 1936, Serial No. 75,814

9 Claims. (Cl. 29—155.5)

This invention relates to conduit outlet boxes and has for its object a method for forming electric conduit outlet boxes from sheet metal tubing and also the method of forming angular electric conduit outlet boxes, that is, conduit outlet boxes which have an angularly extending nipple formed on one or more sides thereof or a plurality of nipples formed on one or more sides.

The invention consists in the method and in the features of construction hereinafter set forth and claimed.

In describing this invention, reference is had to the accompanying drawings in which like characters designate corresponding parts in all the views.

Figures 1 and 2 are respectively an end view and an elevation of a tubular blank of one form of conduit outlet box construction.

Figures 3, 4, 5, 6, 7 and 8 are operation views, Figures 3 and 4 showing the blank after the nipple forming operation; Figures 5 and 6, after a partial box forming operation or after the flattening of opposite sides of the box of the blank; and Figures 7 and 8, after the box has been squared by flattening the bottom and the top cut off to form the opening of the conduit outlet box.

Figure 10 is a side elevation of an angular outlet box.

Figure 11 is a sectional view on line 11—11, Figure 10.

Figure 12 is a sectional view on line 12—12, Figure 11.

Figure 13:
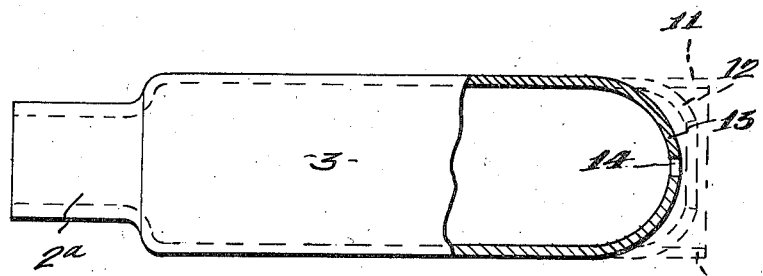
Figure 13 is a view similar to Figure 4, partly in section, illustrating one method of forming from a tube an outlet box with one end closed, in contradistinction to having a nipple at that end.
Figure 14:
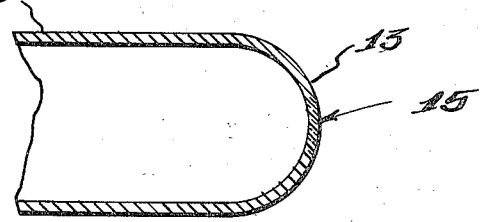
Figure 14 is a fragmentary view illustrating the closed end of the finished box shown in Figure 13.
Figure 15:
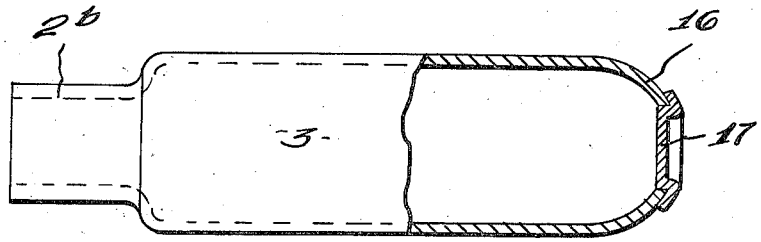
Figures 16, 17:
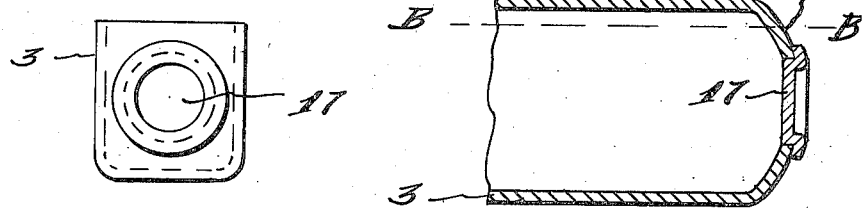
Figures 18, 19:
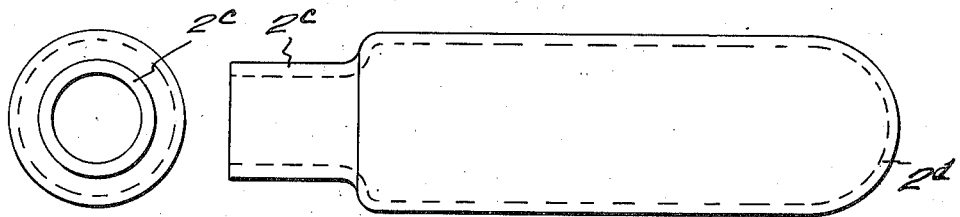
Figures 20, 21:
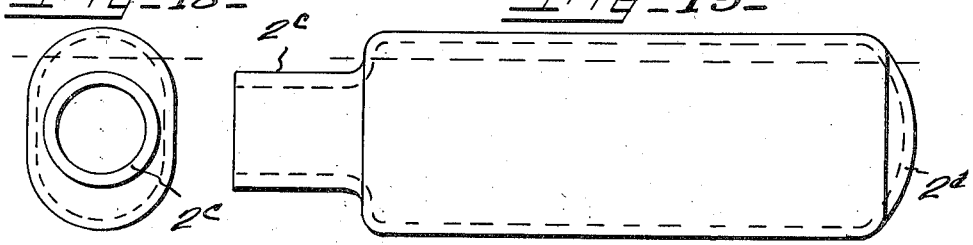
Figures 22, 23:
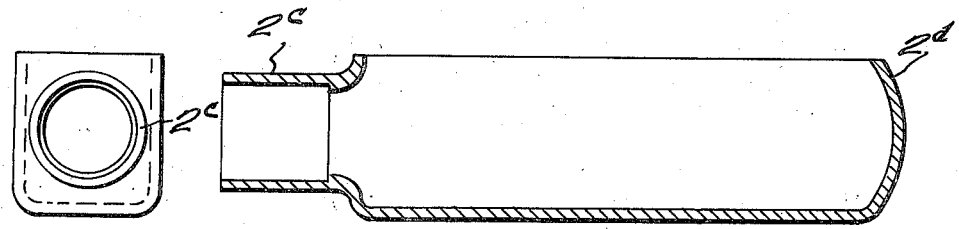
Figure 24:
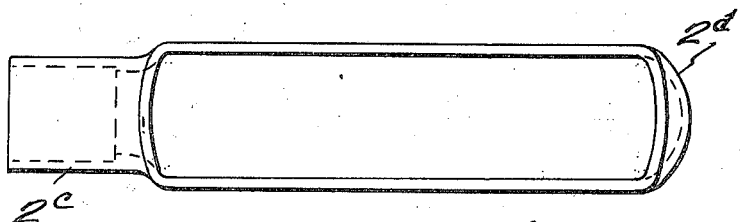

Figures 15 and 16 are views similar to Figures 13 and 14 of a modified form of box shown in Figures 13 and 14.

Figure 17 is an end view of the finished box shown in Figures 15 and 16.

Figures 18, 19, 20, 21, 22, 23, and 24 are views similar to Figures 3 to 9 inclusive, of the type of outlet box in which one end is closed or unprovided with the nipple, which box is formed from a tube or elongated cup-shaped blank, which is initially closed at one end instead of being formed from a tube, as shown in Figure 13, initially open at both ends.

The method of making electric conduit outlet boxes and similar articles consists primarily in reducing the end portion or portions of a sheet metal tube to a smaller diameter than the body of the tube to provide a conduit-receiving nipple at one or both ends; flattening diametrically opposite side portions of the body of the tube, so formed with the reduced end portion or portions until the body of the tube takes an oblong form in cross section with rounding top and bottom ends or walls between the flattened sides; cutting off one of the rounding sides, as the top side of the body of the flattened tube to form an open side in the body of the box for receiving a cover or an electrical appliance in any well known manner.

The method also includes forming an angular conduit outlet box, that is, a conduit outlet box with one or more nipples extending from any side of the box in an angular direction, by forming one or more sides with an opening or openings and securing to said side, as by welding, an adapter box open at one side, with its open side toward the side of the box provided with the opening or openings; forming the outer side of the adapter box with a branch conduit-receiving opening or openings alined with the former opening or openings and with the sides of the adapter box shaped to conform to the branch conduit or conduits. The openings in the sides of the box and in the adapter box may be normally closed by so-called knock-out disks or plugs.

Figure 1:
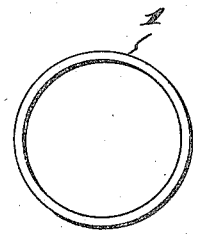
Figure 2:
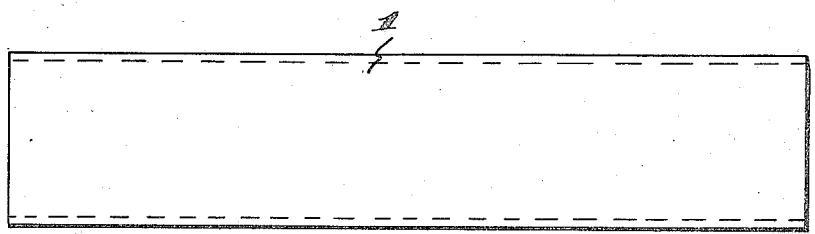
Figure 3:
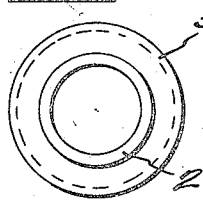
Figure 4:
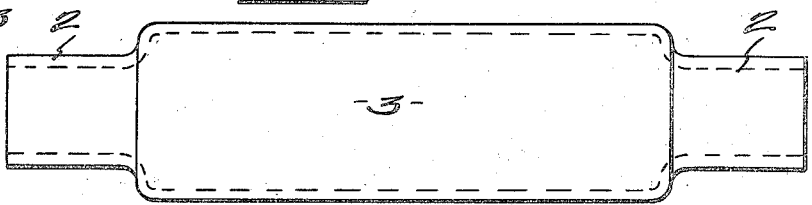
Figure 5:
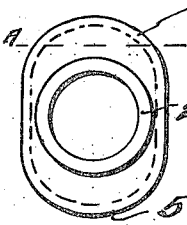
Figure 6:
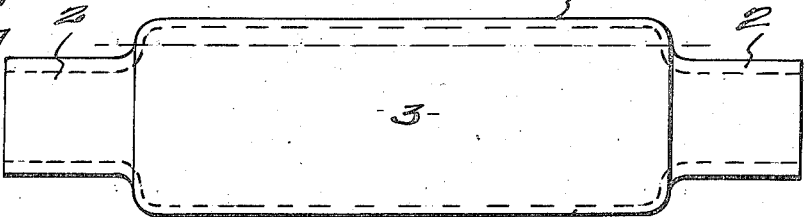
Figure 7:
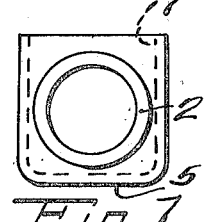
Figure 8:
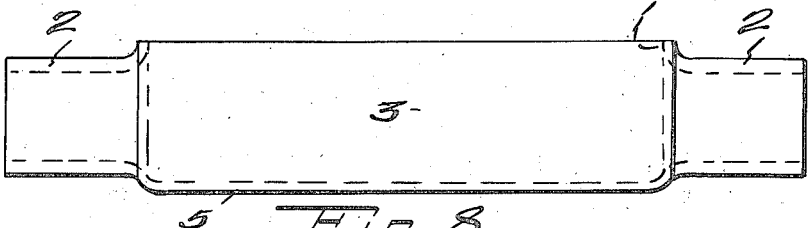
Figure 9:
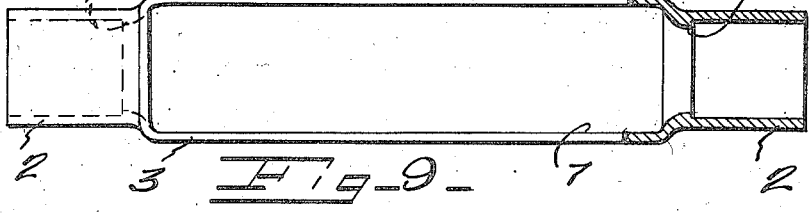
Figure 9 is a plan view of the complete box, partly in section.

In forming a box with conduit-receiving nipples at both ends, a tubular blank 1 is first formed up with reduced end portions 2 of less diameter than the portion 3 of the tube blank which forms the body of the box, as seen in Figures 3 and 4, then flattening opposite side portions of the body of the box forming the body into an oblong formation in cross section with rounding end walls 4, 5, as seen in Figures 5 and 6, then flattening or squaring the rounding wall 5 which constitutes the bottom of the box and cutting off the rounding wall 4 along a line A—A (Figure 5) to form the box with one side open at 7. The reduced end portions of nipples 2 may be machined or bored out to form an angular shoulder at 8 for engaging the end of the electric conduit 9. When the electric conduit 9 is placed in position in the nipple, it may be secured thereto, as by welding, as indicated at 10. The usual cover or base of an electrical appliance may be secured to the open top of the box in any well known manner.

In Figures 13 and 14 is illustrated one method of forming a conduit outlet box which is closed at one end instead of having a nipple at that end, the tube being initially open at both ends. This method consists in reducing or swaging one end of the tube to form the nipple 2ª corresponding to the nipple 2 (Figures 3 to 9 inclusive) and instead of forming a nipple at the other end, closing the other end by folding radially or bending inwardly the margin at the open end of the tubular body 1, from the dotted line position, indicated at 11, into the dotted line position, indicated at 12, and finally into the position indicated at 13, by the full lines, this leaving a small central opening 14, which may be afterwards closed, as by welding, as indicated at 15 (Figure 14). The box is formed with flattened sides and squared bottom and with the open side, the same as described in connection with Figures 3 to 9 inclusive.

In Figures 15, 16 and 17, a slightly modified method is shown of forming the box from a tube but with one end closed or unprovided with a nipple and in this method, the tube is formed with a nipple 2ᵇ by reducing the diameter of the tube at one end and the other end of the tubular body closed by folding the margin thereof inwardly into the position, as shown at 16 (Figure 15), leaving a relatively large opening which is closed by a sheet metal plug 17, preferably welded in position. The blank is squared, as shown in Figure 17, and the top portion 18 cut off on line B—B to form the open side of the box.

In Figures 18, 19, 20, 21, 22, 23 and 24, is illustrated the method of forming a conduit outlet box which is closed at one end instead of having a nipple at that end, and in this construction, the tube is initially formed with a closed end. The tube may also be drawn from a flat discoidal blank into a tubular or elongated cup-shaped form closed at one end by well known drawing and forming operations. The open end of the tube is reduced in diameter to form a nipple 2ᶜ. The tube is then formed into a conduit outlet box open at one side, as shown in the drawings, and in a manner similar to that shown in Figures 3 to 8 inclusive. In the resulting outlet box shown in Figures 23 and 24, one end of the box is closed by a wall 2ᵈ which formed the closed end of the tubular blank.

The method of forming an angular conduit outlet box, that is, a conduit outlet box having a nipple or nipples or a plurality of nipples on one or more sides thereof consists in forming the body 3 of the box with one or more openings, as 21, in the side wall thereof, applying a second or adapter box 22 to the side of the main box in which the opening or openings 21 are formed, the adapter box having openings 23 in its outer side alined with the openings 21 and having its side walls shaped at 24 to fit or conform to the branch conduits 25. The adapter box 22 is formed up of sheet metal and welded to either or both of the sides or bottom of the main box 3, and in order to facilitate the welding, it is formed with an outwardly extending marginal flange 26 on the open side thereof. The openings 21 and 23 may be normally closed with so-called knockout plugs or disks 28. The conduit or conduits 25 are fitted into the openings 23 and also snugly fit the portions 24 of the adapter box 22 and may be firmly secured in the adapter box, as by welding, at 29. The adapter box may be applied to any side of the main box 3, as shown in Figure 12, or, to more than one side, and also the adapter box may be of such size, as to receive a plural number of branch conduits or one branch conduit.

By this method, conduit outlet boxes for numerous situations in which they are used, can be cheaply and economically made from sheet metal blanks or tubes.

Reference is made to my pending application, Serial No. 109,745, filed November 7, 1936 for Method of forming conduit outlet boxes, which relates to forming a conduit outlet box from a sheet metal tube, wherein laterally extending nipples are formed from and integral with the body of the box with the nipple at one or each end of the box formed substantially as shown herein.

What I claim is:—

1. The method of making electric conduit outlet boxes and the like consisting in reducing the end portions of a sheet metal tube to a smaller diameter than the body of the tube to provide conduit-receiving nipples, flattening the diametrically opposite side portions of the body of the tube so formed with the reduced end portions until the body of the tube takes an oblong form with rounding ends between the flat sides, and cutting off one of the rounding sides of the body so flattened, thereby forming an oblong opening in a third side of the body, all whereby the tube is formed into a box with comparatively flat long sides open along a third side and having conduit-receiving nipples at its ends.

2. The method of making electric conduit outlet boxes and the like consisting in reducing the end portions of a sheet metal tube to a smaller diameter than the body of the tube to provide conduit-receiving nipples, flattening the diametrically opposite side portions of the body of the tube so formed with the reduced end portions until the body of the tube takes an oblong form with rounding ends between the flat sides, cutting off one of the sides of the body so flattened, thereby forming an oblong opening in a third side of the body, and flattening the fourth side of the body opposite the open side, all whereby the tube is formed into a box with comparatively flat long sides open along the third side and having conduit-receiving nipples at its ends.

3. The method of making electric conduit outlet boxes and the like consisting in reducing the open end portion of a sheet metal tube which is closed at one end and open at its other end to a smaller diameter than the body of the tube to provide a conduit-receiving nipple, flattening diametrically opposite sides of the body, thereby forming the body into an oblong shape in cross section with rounding end walls, and cutting off the third side to form a box open at one side.

4. The method of making electric conduit outlet boxes and the like consisting in reducing the end portions of a sheet metal tube to a smaller diameter than the body of the tube to provide conduit-receiving nipples at opposite ends of the body, flattening diametrically opposite side portions of the body of the tube so formed with reduced end portions until the body of the tube takes an oblong formation in cross section with rounding sides between the flat sides, cutting off one of the rounding sides of the body along the side of the oblong formation, thereby providing a boxlike body, open at one side, and flattening the rounded side of the body opposite the open side.

5. The method of making electric conduit outlet boxes and the like consisting in reducing one end portion of a tubular sheet metal blank to a smaller diameter than the body of the tube to provide a conduit-receiving nipple at one end, bending inwardly the other end of the tubular blank into a position to close the open end of the tube, flattening diametrically opposite side portions of the body of the tube, and removing the side of the tubular body between the flattened sides, thereby providing a box with one side open.

6. The method of making electric conduit outlet boxes and the like consisting in reducing one end portion of a tubular sheet metal blank to a smaller diameter than the body of the tube to provide a conduit-receiving nipple at one end, bending inwardly the margins of the tubular blank at the other end part way radially inwardly and filling the hole left by the folded-in margins, flattening opposite side portions of the body of the tube and removing one side of the tube between the flattened sides, thereby providing an outlet box open at one side having a nipple at one end and closed at its other end.

7. The method of making electric conduit outlet boxes and the like consisting in forming a tubular blank with one end closed and the other end open, reducing the end portion at the open end to a smaller diameter than the body of the tube to provide a conduit-receiving nipple at one end, removing a side portion of the tubular body, thereby providing a box open at one side having a nipple at one end and being closed at its other end.

8. The method of making electric conduit outlet boxes and the like consisting in reducing the end portions of a sheet metal tube to a smaller diameter than the body of the tube to provide conduit-receiving nipples and removing one side of the body of the tube between the nipples, thereby providing a box open at one side with nipples at opposite ends of the box.

9. The method of making electric conduit outlet boxes and the like consisting in reducing one end portion of a tubular sheet metal blank to a smaller diameter than the body of the tube to form a conduit-receiving nipple, closing the other end of the tubular body and removing a side portion of the tubular body, thereby providing a box open at one side and with a nipple at one end.

CHARLES S. BROWN.